US012646078B2

(12) United States Patent
Hansen et al.

(10) Patent No.: US 12,646,078 B2
(45) Date of Patent: Jun. 2, 2026

(54) CUSTOMIZED DELIVERY OF TRANSACTIONAL DOCUMENTS

(71) Applicant: INTERNATIONAL BUSINESS MACHINES CORPORATION, Armonk, NY (US)

(72) Inventors: Tyler Hansen, Tucson, AZ (US); Logan Bailey, Atlanta, GA (US); Zachary A. Silverstein, Georgetown, TX (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 177 days.

(21) Appl. No.: 18/465,000

(22) Filed: Sep. 11, 2023

(65) Prior Publication Data

US 2025/0086650 A1 Mar. 13, 2025

(51) Int. Cl.
 *G06Q 30/016* (2023.01)

(52) U.S. Cl.
 CPC .................................. *G06Q 30/016* (2013.01)

(58) Field of Classification Search
 None
 See application file for complete search history.

(56) References Cited

U.S. PATENT DOCUMENTS

| 5,550,746 A | 8/1996 | Jacobs |
| 6,879,960 B2 | 4/2005 | Nascenzi |

| 9,129,289 B2 | 9/2015 | Vaughn | |
| 9,383,957 B2 | 7/2016 | Uhlig | |
| 2002/0152123 A1 | 10/2002 | Giordano | |
| 2004/0133474 A1 | 7/2004 | Tami | |
| 2005/0015338 A1* | 1/2005 | Lee ...................... | G06Q 20/102 |
| | | | 705/40 |
| 2005/0071252 A1 | 3/2005 | Henning | |
| 2007/0183000 A1* | 8/2007 | Eisen ................... | H04N 1/4486 |
| | | | 358/452 |
| 2011/0208588 A1* | 8/2011 | Joa ..................... | G06Q 30/0258 |
| | | | 705/30 |
| 2019/0222540 A1* | 7/2019 | Relangi .................. | G10L 15/26 |

(Continued)

OTHER PUBLICATIONS

Huang, et al., "Technology-Driven Service Strategy", J. of the Acad. Mark. Sci., Jun. 5, 2017, 19 pgs.

(Continued)

*Primary Examiner* — George Chen
(74) *Attorney, Agent, or Firm* — Anthony Curro

(57) ABSTRACT

A computer-implemented method, a computer system and a computer program product customize delivery of transactional documents. The method includes receiving a transactional document associated with a user. The method also includes obtaining a preferred document format for the user and a preferred delivery method for the user from a database. The method further includes identifying a current display format of the transactional document. In addition, the method includes modifying the current display format of the transactional document, wherein a modified transactional document has the preferred document format for the user. Lastly, the method includes transmitting the modified transactional document to the user using the preferred delivery method for the user.

20 Claims, 2 Drawing Sheets

(56) References Cited

U.S. PATENT DOCUMENTS

| | | | | |
|---|---|---|---|---|
| 2019/0392943 | A1* | 12/2019 | Sorenson | G16H 50/20 |
| 2020/0285771 | A1* | 9/2020 | Dey | G06F 21/6272 |
| 2022/0215172 | A1* | 7/2022 | Yoo | G06F 16/93 |

OTHER PUBLICATIONS

IBM, "Payments Services on the Cloud", IBM.com, [Accessed Jul. 28, 2023], 7 pgs., Retrieved from the Internet: <https://www.ibm.com/consulting/payments>.
IBM, "Payments Solution, Modernize Your Payments with IBM", IBM.com, [Accessed Jul. 28, 2023], 11 pgs., Retrieved from the Internet: <https://www.ibm.com/consulting/payments-solution>.
Liang et al., "Effect of Personalization on the Perceived Usefulness of Online Customer Services: A Dual-Core Theory", ICEC '09, Aug. 12-15, 2009, pp. 279-288.

* cited by examiner

100

CUSTOMIZED DELIVERY OF TRANSACTIONAL DOCUMENTS

BACKGROUND

Embodiments relate generally to the field of commercial transactions and, more specifically, to customizing the delivery of transactional documents to users using machine learning.

In today's environment, users may perform several transactions every day that may result in various forms of documentation, such as receipts for purchases, contracts for services or purchases or personal records or reports. These transactional documents may be presented to users in a variety of presentation formats and may also be delivered to users through multiple methods, e.g., paper or electronic delivery. Both users and commercial enterprises may prefer the same or different presentation formats and/or delivery methods.

SUMMARY

An embodiment is directed to a computer-implemented method for customized delivery of transactional documents. The method may include receiving a transactional document associated with a user. The method may also include obtaining a preferred document format for the user and a preferred delivery method for the user from a database. The method may further include identifying a current display format of the transactional document. In addition, the method may include modifying the current display format of the transactional document, wherein a modified transactional document has the preferred document format for the user. Lastly, the method may include transmitting the modified transactional document to the user using the preferred delivery method for the user.

In another embodiment, the method may include displaying a first list of presentation formats and a second list of delivery methods to the user. In this embodiment, the method may also include storing the preferred document format and the preferred delivery method in the database in response to the user selecting the preferred document format from the first list of presentation formats and the preferred delivery method from the second list of delivery methods.

In a further embodiment, the obtaining the preferred document format for the user and the preferred delivery method for the user may comprise using a machine learning model that predicts user preferences for the preferred document format and the preferred delivery method from prior transactions associated with the user.

In yet another embodiment, the method may include displaying the preferred document format and the preferred delivery method to the user. In this embodiment, the method may also include monitoring interactions of the user with the preferred document format and the preferred delivery method and updating the preferred document format and the preferred delivery method in the database based on the interactions.

In still another embodiment, where the preferred delivery method for the user and the preferred document format for the user are associated in the database with a vendor, the method may include detecting a transaction between the vendor and the user and transmitting the modified transactional document to the user using the preferred delivery method for the user, where the modified transactional document has the preferred document format for the user.

In an additional embodiment, where the preferred delivery method for the user and the preferred document format for the user are associated in the database with a document type, the method may include identifying the document type for the transactional document and transmitting the modified transactional document to the user using the preferred delivery method for the user, where the modified transactional document has the preferred document format for the user.

In another embodiment, the method may include determining that the transactional document includes information sensitive to the user and modifying the transactional document, where the modified transactional document does not include the information sensitive to the user.

In addition to a computer-implemented method, additional embodiments are directed to a computer system and a computer program product for customized delivery of transactional documents.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Users in today's environment perform transactions that result in documentation, e.g., receipts or contracts when making purchases or various reports and records, e.g., medical or dental records or court documents. Delivery of this documentation may be at the discretion of providers, including both the presentation format, including both the information itself and how the information is displayed, and the delivery method, such as paper or electronic. As an example, customers of certain retail outlets may have the option of paper or electronic documents, but every physical paper receipt may be printed identically and may include information that a user might not want to be printed on the receipt. In addition, certain businesses may not offer any electronic documents at all. In most of these cases, the retailer or other vendor controls the format and delivery method, or the ability for customers or users to make choices in these areas.

It may therefore be useful to provide a method or system to customize the delivery of transactional documents, such as receipts or other reports or records, to users. Such a method or system may develop a profile of a user, either manually or using a machine learning model, so that when a transaction occurs, a user preference for the presentation format or delivery method may be understood and applied to the transactional document. The document may then be transmitted to the user in the format and method that the user may prefer. Such a method or system may increase the efficiency of point of sale (POS) transactions by providing necessary documentation in a form that users prefer and also reduce wasted time and effort of users in storing transactional documents or manually converting between formats or delivery methods as required in the current environment. The method or system may also be used universally in any commercial transaction or even medical or dental visits or any interaction that a user might encounter that may generate documentation.

Figure 1:
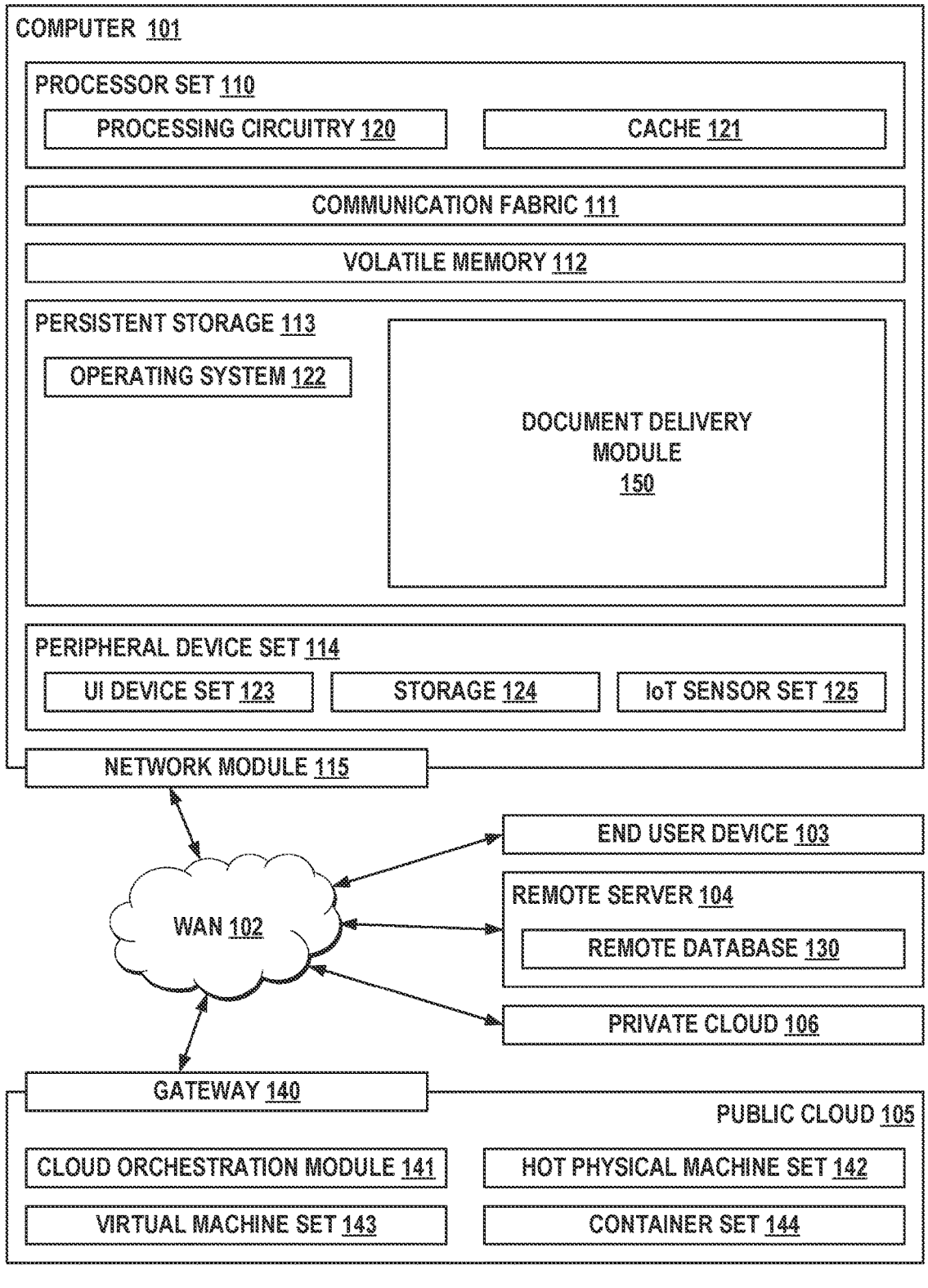
FIG. 1 depicts a block diagram of an example computer system in which various embodiments may be implemented.

Referring to FIG. 1, computing environment 100 contains an example of an environment for the execution of at least some of the computer code involved in performing the inventive methods, such as document delivery module 150. In addition to document delivery module 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and document delivery module 150, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/ or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in document delivery module 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The code included in document delivery module 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of VCEs will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Computer environment 100 may be used to customize delivery of transactional documents. In particular, document delivery module 150 may receive a transactional document associated with a user that may have been generated from a commercial transaction or some other interaction with the user. The document delivery module 150 may obtain user preferences that may include a preferred document format, such as display formatting or limitations on the information that may be displayed within the transactional document, and a preferred delivery method, e.g., paper or electronic, for the user. The user preferences may be manually gathered from the user or obtained from a user profile stored in a database or other indexed storage, which may in turn be local to the user or remotely stored on a server or a cloud service. In another embodiment, a machine learning model may predict the user preferences from prior transactions or interactions of the user. The current display format of the transactional document may be identified and compared to the user's preferred document format, at which point the transactional document may be modified according to the preferred document format. It should be noted that it is not required for the document delivery module 150 to make the modifications the transactional document, but rather forward instructions to a vendor or other source of the transactional document to make the actual modifications according to the preferred document format of the user. Lastly, the modified transactional document may be transmitted or forwarded to the user via the user's preferred delivery method. In this way, the delivery of the transactional document is customized for the user.

Figure 2:
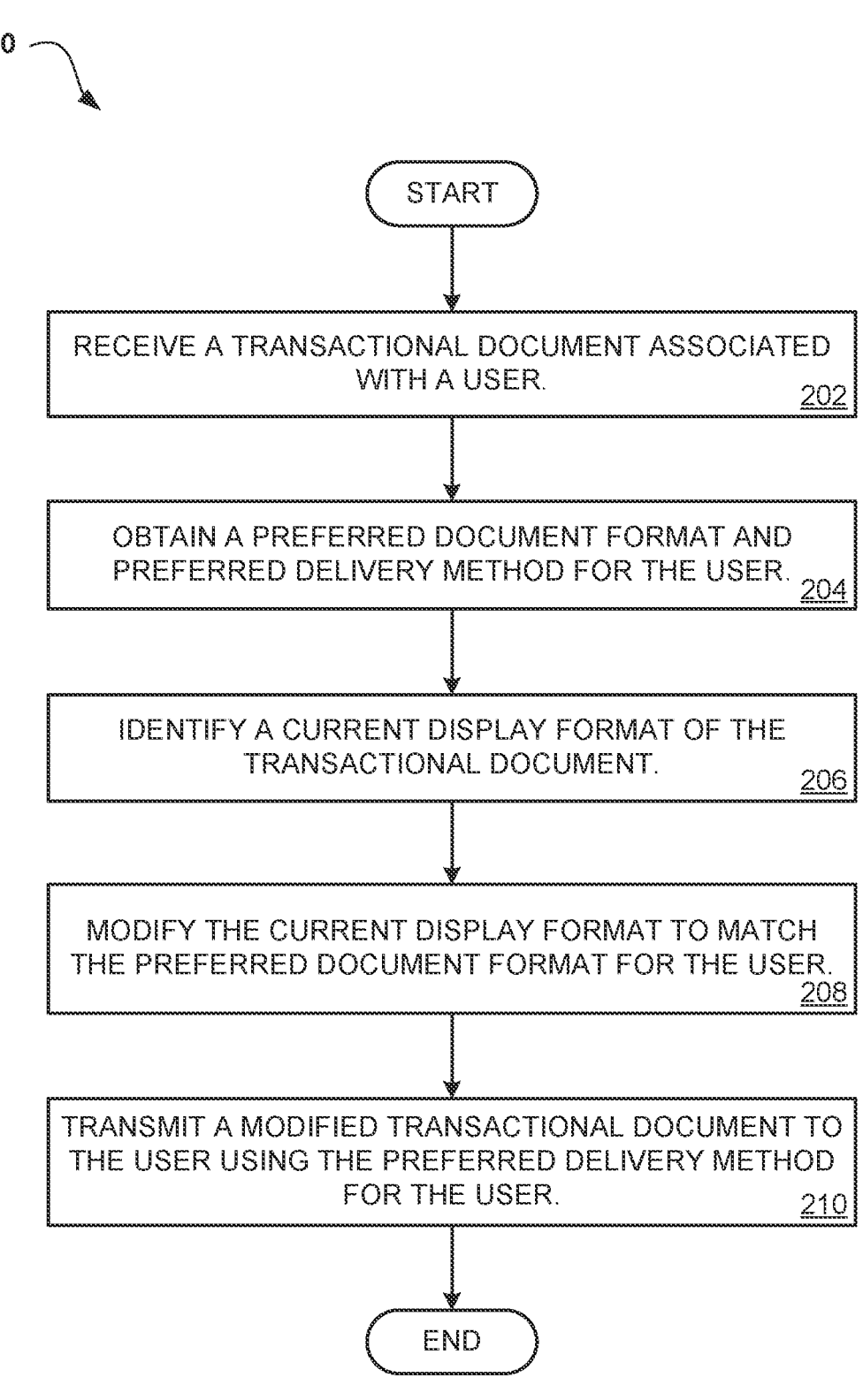
FIG. 2 depicts a flow chart diagram for a process that customizes delivery of transactional documents according to an embodiment.

Referring to FIG. 2, an operational flowchart illustrating a process 200 that customizes delivery of transactional documents is depicted according to at least one embodiment. At 202, the document delivery module 150 may receive a transactional document associated with a user. As described herein, a transactional document may be a receipt or other report or record that may serve as documentation of a transaction or interaction associated with the user. For instance, a user may have a medical appointment and need a prescription or other document from the medical office. Another example may be a simple commercial transaction involving the user, where a receipt may be generated from the sale of consumer products. In these cases, the medical document or receipt may be recognized as the transactional document. It should be noted that while the transactional document may be generated by the transaction or other interaction associated with the user, the detection of an actual transaction or interaction itself is not required, only the receipt of the transactional document associated with the user. However, the document delivery module 150 may interface with systems that may process transactions or interactions, e.g., point of sale (POS) terminals, that may also generate the transactional documents and therefore the document delivery module 150 may be aware of the details or the transaction or interaction and may store any information that is received, e.g., in the database or indexed storage described below and associated with the user.

At 204, user preferences may be obtained that may include a preferred document format and delivery method for the user. Such preferences may be obtained through manual entry by a user or may be stored in a database or indexed storage with an association to the user, such as in a user profile. Document format may include both the visual format of the document, e.g., margins and indentation, as well as text font and size, and also what information may be included in the transactional document, such as personally identifying information (PII) or other information sensitive to the user. As a result, the preferred document format may include a user preference for how the transactional document may look, or how the document is formatted, and also a requirement to delete or redact sensitive information in transactional documents. In addition, the delivery method may include but is not limited to a paper or other hard copy, i.e., printing a physical copy for a user, or electronic delivery, where a digital file containing the transactional document may be sent to the user via email or SMS message or posted to a website or portal that may be specific to the user.

The user preferences for both document format and delivery method may also be associated with a vendor in the database, such that a user may have different preferences depending on the vendor or document type. For instance, a retailer may include a credit card number on its receipts, so a user may prefer to receive paper copies of documents from that vendor at the time of purchase to limit the dissemination of the information. Alternatively, the user may prefer to have the sensitive information redacted or deleted and then receive an electronic copy. If the vendor is a law firm or other official authority, then a user may decide to receive paper copies only for the user's records. In addition to vendor, a document type may also be associated with the user preferences in the database such that a user may have a different preferred document format and delivery method based on the association. A non-exhaustive list of document types may include receipts, contracts, financial documents, health documents or medical records, PII documents, reports, invoices, legal documents, tax documents, delivery notices, and order confirmations or shipping records. One of ordinary skill in the art will recognize that there are several types of documents that may be recognized as transactional documents, or documentation of various transactions or interactions that a user may encounter.

In the case of manual entry of user preferences, a first list of document formats and a second list of delivery methods, including the options that are mentioned above but not limited to those options, may be displayed to a user and the document delivery module 150, in response to the selections of the user, may store the user preferences in the database with an association to the user. It should be noted that all collection of information that may personally identify any user or is sensitive in any other way (the PII or other information sensitive to the user mentioned above) requires the informed consent of all people whose information may be collected and analyzed for the purposes of the invention. Consent may be obtained in real time or through a prior waiver or other process that informs a subject that their information may be captured by a device or other process and that the information may be used in customizing the format and delivery of a transactional document related to transactions or interactions associated with the user. The information owner is free to decide at any time to revoke consent for use of sensitive information as these settings are permanently retained to keep the document delivery module 150 updated with the latest information and also allow the owner of the information complete control over their informed consent to use sensitive information in the course of the invention. The consent described here may also refer to allowing some, or any, data relating to an information owner's vehicle from being sent to a local server, cloud server or any other location. The owner has complete control on the transmission of information that may be sensitive or personally identify the owner of the information.

In an embodiment, a supervised machine learning model may be trained to predict the user preferences for the preferred document format and the preferred delivery method from prior transactions associated with the user. One or more of the following machine learning algorithms may be used: logistic regression, naive Bayes, support vector machines, deep neural networks, random forest, decision tree, gradient-boosted tree, multilayer perceptron. One of ordinary skill in the art will recognize that this is a non-limiting list of algorithms that may be used at this step. In an embodiment, an ensemble machine learning technique may be employed that uses multiple machine learning algorithms together to assure better classification when compared with the classification of a single machine learning algorithm. In this embodiment, training data for the model may comprise any prior transactions or interactions that may be associated with the user, e.g., purchases made by the user or preparation of legal documents. The training data may be collected from a single prior transaction or interaction associated with the user or from multiple transactions or interactions over a longer period of time. The results may be stored in a database so that the data is most current, and the output would always be up to date.

Automatic obtaining of user preferences and storage in the database may also be accomplished using Internet of Things (IoT) data related to the user. As an example, if a transaction were detected that may involve the user, additional data may be obtained related to the transaction and the user from any enabled device, such as a device worn by the user or nearby devices that may be network-enabled. Such contextual data about the transaction or user may be included in determining the user preferences for a transactional document that may be related to the document type or the vendor in the database or may simply be related to the transactional document in the database. It should also be noted that a database as described herein need not consist of a single file on a single server, but may rather include blockchain technology, such that the information in a respective database may be secure and stored in a distributed fashion.

The document delivery module 150 may further display the preferred document format and preferred delivery method to the user once obtained. As the user may interact with the user preferences that may be stored in the database or generated by the above machine learning model, these user interactions may be continuously monitored, and the user may be asked for feedback about the user preferences. If the preferred document format or preferred delivery method are incorrect, this may be noted by the user and the preferred document format and preferred delivery method may be updated to reflect the user interactions. This feedback may be used to refine the machine learning model that predicts the user preferences.

At 206, the current display format of the transactional document may be identified or recognized using computer vision algorithms, e.g., text recognition or object recognition, and compared to the preferred presentation format of the user. The current display format may include information about both the display of the document, e.g., paragraph structure or margins or line spacing or text justification (text formatting), and also the actual information included in the document, e.g., specific words, phrases or graphical content. Identifying the current display format of the document may entail any of several computer vision techniques, including object recognition for graphical data that may be in the document and text recognition. One of ordinary skill in the art will recognize that there are many computer vision techniques that may be used at this step, as well as other methods for recognizing the current display format, including a determination of the presence of information sensitive to the user in the transactional document. At this stage, any such information sensitive to the user may be identified and tagged for redaction or deletion as may be required by the user.

At this step, the transactional document may also be classified according to the vendor or document type, as mentioned above, where natural language processing (NLP) algorithms may be applied to recognized text and, from the text itself or a determined meaning of the text, the transactional document may be classified such that appropriate preferences may be applied to the document below.

At 208, the transactional document may be modified according to the preferred document format for the user. As mentioned above, the document format may also include both the display of the document and also the information included in the document and this stage may include the deletion or redaction of the information sensitive to the user. Modification of the transactional document may include the deletion or moving of characters or graphical elements to change the display of the document in a way that is more to the like of the user, i.e., fits the preferred document format. As an example, the user may prefer double-spaced text in certain documents for easier understanding of the content, but the current display format may be single-spaced. As part of the modification of the document, the text may double-space all text in the transactional document. Likewise, other text formatting attributes may be changed, such as margins or paragraph formatting, such as tab stops. With respect to the information in the document, modification of the transactional document may include redaction of information sensitive to the user. Redaction may include creating a graphic that may be overlaid on text to prevent the text from being read or may alternatively comprise replacement of text characters with specific or random characters, also to prevent the text from being read or the information sensitive to the user from being disseminated. Once complete, the transactional document may be aligned or matched with the preferred document format of the user.

At 210, the transactional document may be transmitted to the user using the preferred delivery method. For instance, a physical copy may be printed for the user immediately or sent via postal mail if the user prefers paper delivery. Alternatively, if the preferred delivery method is electronic, then the transactional document may be sent to the user in the form, e.g., email or SMS message, that may be specified in the preferred delivery method. It should be noted that the document delivery module 150 may block the transmitting of the transactional document at this step by modifying the preferred delivery method in the presence of information sensitive to the user. For instance, if the document delivery module 150 determines that information sensitive to the user is included in the transactional document, physical copies of a transactional document may be blocked from transmission regardless of the preferred delivery method, so that the information sensitive to the user cannot be revealed in a public environment.

It should be noted that the delivery method may also include security preferences and settings for the user. Security preferences may refer to authentication protocols or encryption techniques, e.g., symmetric key encryption or public-key cryptography, that may be related to the delivery of the transactional document. One of ordinary skill in the art will recognize that there are many ways to provide secure delivery of data as part of a transaction or other interaction between distinct users or vendors. Enhanced security measures may also be taken with respect to storing data in a database, e.g., requiring authentication by users prior to accessing information in the database and encrypting data prior to storage in the database or other indexed storage.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for customized delivery of transactional documents using machine learning according to user preferences, the computer-implemented method comprising:

receiving a transactional document associated with a user;

obtaining a preferred document format for the user and a preferred delivery method for the user from a database, the preferred document format generated automatically by a machine learning model by predicting the user preferences from prior transactions or interactions of the user;

identifying a current display format of the transactional document using computer vision, the current display format including information about a display of the transactional document and information contained within the transactional document;

modifying the current display format of the transactional document, wherein a modified transactional document has the preferred document format for the user including the identified current display format and information contained within the transactional document; and transmitting the modified transactional document to the user using the preferred delivery method for the user, transmitting the modified transactional document to improve an efficiency of transaction by providing documentation in a form that the user prefers universally in any transaction across vendors.

2. The computer-implemented method of claim 1, further comprising:

displaying a first list of presentation formats and a second list of delivery methods to the user; and in response to the user selecting the preferred document format from the first list of presentation formats and the preferred delivery method from the second list of delivery methods, storing the preferred document format and the preferred delivery method in the database.

3. The computer-implemented method of claim 1, wherein the obtaining the preferred document format for the user and the preferred delivery method for the user further comprises using the machine learning model that predicts user preferences for the preferred document format and the preferred delivery method from prior transactions associated with the user.

4. The computer-implemented method of claim 1, further comprising:

displaying the preferred document format and the preferred delivery method to the user;

monitoring interactions of the user with the preferred document format and the preferred delivery method; and updating the preferred document format and the preferred delivery method in the database based on the interactions.

5. The computer-implemented method of claim 1, further comprising:

detecting a transaction between a vendor and the user, wherein the preferred delivery method for the user and the preferred document format for the user are associated in the database with the vendor, and when transmitting the modified transactional document to the user using the preferred delivery method for the user, the modified transactional document utilizes the preferred document format for the user.

6. The computer-implemented method of claim 1, further comprising:

identifying a document type for the transactional document, wherein the preferred delivery method for the user and the preferred document format for the user are associated in the database with the document type and when transmitting the modified transactional document to the user using the preferred delivery method for the user, the modified transactional document utilizes the preferred document format for the user.

7. The computer-implemented method of claim 1, further comprising:

determining that the transactional document includes information sensitive to the user, wherein when modifying the transactional document the modified transactional document does not include the information sensitive to the user.

8. A computer system for customized delivery of transactional documents using machine learning according to user preferences, the computer system comprising:

one or more processors, one or more computer-readable memories, and one or more computer-readable storage media;

program instructions, stored on at least one of the one or more computer-readable storage media for execution by at least one of the one or more processors via at least one of the one or more computer-readable memories, to receive a transactional document associated with a user;

program instructions, stored on at least one of the one or more computer-readable storage media for execution by at least one of the one or more processors via at least one of the one or more computer-readable memories, to obtain a preferred document format for the user and a preferred delivery method for the user from a database, the preferred document format generated automatically by a machine learning model by predicting the user preferences from prior transactions or interactions of the user;

program instructions, stored on at least one of the one or more computer-readable storage media for execution by at least one of the one or more processors via at least one of the one or more computer-readable memories, to identify a current display format of the transactional document using computer vision, the current display format including information about a display of the transactional document and information contained within the transactional document;

program instructions, stored on at least one of the one or more computer-readable storage media for execution by at least one of the one or more processors via at least one of the one or more computer-readable memories, to modify the current display format of the transactional document, wherein a modified transactional document has the preferred document format for the user including the identified current display format and information contained within the transactional document; and program instructions, stored on at least one of the one or more computer-readable storage media for execution by at least one of the one or more processors via at least one of the one or more computer-readable memories, to transmit the modified transactional document to the user using the preferred delivery method for the user, transmitting the modified transactional document to improve an efficiency of a transaction by providing documentation in a form that the user prefers universally in any transaction across vendors.

9. The computer system of claim 8, further comprising:

program instructions, stored on at least one of the one or more computer-readable storage media for execution by at least one of the one or more processors via at least one of the one or more computer-readable memories, to display the preferred document format and the preferred delivery method to the user;

program instructions, stored on at least one of the one or more computer-readable storage media for execution by at least one of the one or more processors via at least one of the one or more computer-readable memories, to monitor interactions of the user with the preferred document format and the preferred delivery method; and program instructions, stored on at least one of the one or more computer-readable storage media for execution by at least one of the one or more processors via at least one of the one or more computer-readable memories, to update the preferred document format and the preferred delivery method in the database based on the interactions.

10. The computer system of claim 9, further comprising:

program instructions, stored on at least one of the one or more computer-readable storage media for execution by at least one of the one or more processors via at least one of the one or more computer-readable memories, to identify a document type for the transactional document, wherein the preferred delivery method for the user and the preferred document format for the user are associated in the database with the document type and when transmitting the modified transactional document to the user using the preferred delivery method for the user, the modified transactional document utilizes the preferred document format for the user.

11. The computer system of claim 8, further comprising:

program instructions, stored on at least one of the one or more computer-readable storage media for execution by at least one of the one or more processors via at least one of the one or more computer-readable memories, to display a first list of presentation formats and a second list of delivery methods to the user; and program instructions, stored on at least one of the one or more computer-readable storage media for execution by at least one of the one or more processors via at least one of the one or more computer-readable memories, to, in response to the user selecting the preferred document format from the first list of presentation formats and the preferred delivery method from the second list of delivery methods, store the preferred document format and the preferred delivery method in the database.

12. The computer system of claim 8, wherein the program instructions, stored on at least one of the one or more computer-readable storage media for execution by at least one of the one or more processors via at least one of the one or more computer-readable memories, to obtain the preferred document format for the user and the preferred delivery method for the user further comprise using the machine learning model that predicts user preferences for the preferred document format and the preferred delivery method from prior transactions associated with the user.

13. The computer system of claim 8, further comprising:

program instructions, stored on at least one of the one or more computer-readable storage media for execution by at least one of the one or more processors via at least one of the one or more computer-readable memories, to detect a transaction between a vendor and the user, wherein the preferred delivery method for the user and the preferred document format for the user are associated in the database with the vendor, and when transmitting the modified transactional document to the user using the preferred delivery method for the user, the modified transactional document utilizes the preferred document format for the user.

14. The computer system of claim 8, further comprising:

program instructions, stored on at least one of the one or more computer-readable storage media for execution by at least one of the one or more processors via at least one of the one or more computer-readable memories, to determine that the transactional document includes information sensitive to the user, wherein when modifying the transactional document, the modified transactional document does not include the information sensitive to the user.

15. A computer program product for customized delivery of transactional documents using machine learning according to user preferences, the computer program product comprising:

one or more computer-readable storage media;

program instructions, stored on at least one of the one or more computer-readable storage media, to receive a transactional document associated with a user;

program instructions, stored on at least one of the one or more computer-readable storage media, to obtain a preferred document format for the user and a preferred delivery method for the user from a database, the preferred document format generated automatically by a machine learning model by predicting the user preferences from prior transactions or interactions of the user;

program instructions, stored on at least one of the one or more computer-readable storage media, to identify a current display format of the transactional document using computer vision, the current display format including information about a display of the transactional document and information contained within the transactional document;

program instructions, stored on at least one of the one or more computer-readable storage media, to modify the current display format of the transactional document, wherein a modified transactional document has the preferred document format for the user including the identified current display format and information contained within the transactional document; and program instructions, stored on at least one of the one or more computer-readable storage media, to transmit the modified transactional document to the user using the preferred delivery method for the user, transmitting the modified transactional document to improve an efficiency of a transaction by providing documentation in a form that the user prefers universally in any transaction across vendors.

16. The computer program product of claim 15, further comprising:

program instructions, stored on at least one of the one or more computer-readable storage media, to detect a transaction between the vendor and the user, wherein the preferred delivery method for the user and the preferred document format for the user are associated in the database with the vendor, and when transmitting the modified transactional document to the user using the preferred delivery method for the user, the modified transactional document utilizes the preferred document format for the user.

17. The computer program product of claim 16, further comprising:

program instructions, stored on at least one of the one or more computer-readable storage media, to identify a document type for the transactional document, wherein the preferred delivery method for the user and the preferred document format for the user are associated in the database with the document type and when transmitting the modified transactional document to the user using the preferred delivery method for the user, the modified transactional document utilizes the preferred document format for the user.

18. The computer program product of claim 15, further comprising:

program instructions, stored on at least one of the one or more computer-readable storage media, to display a first list of presentation formats and a second list of delivery methods to the user; and program instructions, stored on at least one of the one or more computer-readable storage media, to, in response to the user selecting the preferred document format from the first list of presentation formats and the preferred delivery method from the second list of delivery methods, store the preferred document format and the preferred delivery method in the database.

19. The computer program product of claim 15, wherein the program instructions, stored on at least one of the one or more computer-readable storage media, to obtain the preferred document format for the user and the preferred delivery method for the user further comprise using the machine learning model that predicts user preferences for the preferred document format and the preferred delivery method from prior transactions associated with the user.

20. The computer program product of claim 15, further comprising:

program instructions, stored on at least one of the one or more computer-readable storage media, to determine that the transactional document includes information sensitive to the user, wherein when modifying the transactional document, the modified transactional document does not include the information sensitive to the user.

* * * * *